(12) United States Patent
Kim et al.

(10) Patent No.: US 11,445,098 B2
(45) Date of Patent: Sep. 13, 2022

(54) CAMERA ASSEMBLY AND ELECTRONIC DEVICE INCLUDING SAME

(71) Applicant: Samsung Electronics Co., Ltd., Gyeonggi-do (KR)

(72) Inventors: Ilyoung Kim, Gyeonggi-do (KR); Wonjun Jeong, Gyeonggi-do (KR); Moonkyeong Kim, Gyeonggi-do (KR); Junyoung Kim, Gyeonggi-do (KR); Jaeyoung Huh, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/172,180

(22) Filed: Feb. 10, 2021

(65) Prior Publication Data

US 2021/0250509 A1 Aug. 12, 2021

(30) Foreign Application Priority Data

Feb. 10, 2020 (KR) ........................ 10-2020-0015830

(51) Int. Cl.
*H04N 5/225* (2006.01)
(52) U.S. Cl.
CPC ......... *H04N 5/2257* (2013.01); *H04N 5/2252* (2013.01); *H04N 5/2254* (2013.01)
(58) Field of Classification Search
CPC . H04N 5/2251–225251; H04N 5/2254; H04N 5/23287; G03B 5/00–08;

(Continued)

(56) References Cited

U.S. PATENT DOCUMENTS

| 2014/0253799 A1* | 9/2014 | Moon | ................. H04N 5/2252 348/376 |
| 2014/0267767 A1* | 9/2014 | Choi | ..................... G03B 17/02 348/164 |

(Continued)

FOREIGN PATENT DOCUMENTS

| CN | 110441979 A | * 11/2019 | ............. G03B 17/08 |
| JP | 2013-122575 A | 6/2013 | |

(Continued)

OTHER PUBLICATIONS

International Search Report dated Jun. 4, 2021.

*Primary Examiner* — Paul M Berardesca
(74) *Attorney, Agent, or Firm* — Cha & Reiter, LLC

(57) ABSTRACT

An electronic device may include a housing including a first surface, a second surface, and a side surface, a camera module disposed at a position aligned with an opening formed in the first surface, a decorative member including a first portion connected to the first surface at a position at which the opening is formed and having a hollow, a second portion extending from the first portion and surrounding the hollow, and a window seated on the second portion, a processor, and a memory, wherein the camera module includes at least one lens, and a lens barrel including a cylindrical lower portion, an extension portion extending from the lower portion, and a cylindrical upper portion extending from the extension portion, and the distance from the lower portion to the first portion is smaller than the distance from the upper portion to the window.

20 Claims, 8 Drawing Sheets

(58) Field of Classification Search
CPC ........... G03B 17/00–17; G03B 2205/00–0084;
H04M 1/0264
See application file for complete search history.

(56) References Cited

U.S. PATENT DOCUMENTS

| | | |
|---|---|---|
| 2014/0294376 A1 | 10/2014 | Kim et al. |
| 2014/0368711 A1 | 12/2014 | O'Brien |
| 2015/0015770 A1 | 1/2015 | Baik et al. |
| 2015/0116581 A1* | 4/2015 | Liu .................... H04N 5/23287 |
| | | 348/357 |
| 2017/0150022 A1* | 5/2017 | Shigemitsu ............ G03B 17/02 |
| 2019/0391410 A1 | 12/2019 | Park et al. |
| 2020/0412920 A1* | 12/2020 | Yao ...................... H04N 5/2258 |

FOREIGN PATENT DOCUMENTS

| | | |
|---|---|---|
| KR | 10-0897676 B1 | 5/2009 |
| KR | 10-1005773 B1 | 1/2011 |
| KR | 10-2013-0047659 A | 5/2013 |
| KR | 10-2014-0073233 A | 6/2014 |
| KR | 10-1693462 A | 1/2017 |

* cited by examiner

CAMERA ASSEMBLY AND ELECTRONIC DEVICE INCLUDING SAME

CROSS-REFERENCE TO RELATED APPLICATION(S)

This application is based on and claims priority under 35 U.S.C. 119 to Korean Patent Application No. 10-2020-0015830, filed on Feb. 10, 2020, in the Korean Intellectual Property Office, the disclosure of which is herein incorporated by reference in its entirety.

BACKGROUND

1) Field

Various embodiments relate to an electronic device including a camera assembly, and, more particularly, to automatic physical reconfigurations of the camera assembly during falls to prevent damage.

2) Description of Related Art

Recently, electronic devices including cameras (for example, digital cameras, digital camcorders, or smartphones) have become increasingly widespread. An electronic device including a camera may provide an imaging function. For example, the electronic device may output, through a display, preview images acquired from the camera, and may capture and store an image according to an input from a user.

Meanwhile, a camera may include a transparent window covering the camera, and a camera lens mounted such that the interval between the lens and the window (e.g., an air gap) is small relative to the size of a transparent area of the window (e.g., a 0.1 mm gap), which serves as a pathway for incident light (e.g., a printed hole), and the size of a structure supporting the window (e.g., a camera deco).

The above information is presented as background information only to assist with an understanding of the disclosure. No determination has been made, and no assertion is made, as to whether any of the above might be applicable as prior art with regard to the disclosure.

SUMMARY

In line with the increasing demand for high-performance cameras, image sensors and lenses included in cameras have generally increased in size. Nowadays, smartphones may be equipped with camera modules housing one or more cameras, which protrudes from a surface of the smartphone. If an electronic device employing a large and heavy lens falls, the camera lens and the window may collide. Factors tending to increase the likelihood of collision include the physical protrusion of the lens which, as noted above, has increased in comparison with older, single module cameras. A collision between the camera lens and the window may damage the upper surface of the lens, and foreign or broken components may be scattered within the assembly, affecting the ability to capture images or degrading the quality of any captured images.

Various embodiments may provide a camera assembly and an electronic device including the same, the camera assembly having such a structure that, when the electronic device falls, no collision occurs between the camera lens and the window.

An electronic device according to certain embodiments may include a housing including a first surface facing a first direction, a second surface facing a second direction opposite to the first direction, and a side surface at least partially surrounding a space formed between the first surface and the second surface, a camera module seated inside the housing and disposed at a position aligned with an opening formed in the first surface, a housing member including a first portion connected to the first surface at a position where the opening is formed and forming a hollow corresponding to the opening, a second portion extending from the first portion in a direction substantially identical to the first direction and surrounding the hollow, and a window seated on the second portion covering the hollow, a camera module seated within the housing, and aligned with an opening formed in the first surface, a processor operatively connected to the camera module; and a memory operatively connected to the processor, wherein the camera module includes at least one lens, and a lens barrel including a cylindrical lower portion having a diameter greater than the at least one lens, an extension portion extending from a top surface of the lower portion in a direction oblique to the first direction, and a cylindrical upper portion extending from a top surface of the extension portion in the first direction and having a diameter smaller than the lower portion, and wherein a distance from the top surface of the lower portion to a bottom surface of the first portion is smaller than a distance from a top surface of the upper portion to a bottom surface of the window.

In addition, a camera assembly according to certain embodiments may include a housing member including a first portion forming a hollow, a second portion extending from the first portion in a first direction and surrounding the hollow, and a window seated on the second portion covering the hollow, a frame spaced by a predetermined distance apart from a bottom surface of the first portion in a second direction opposite to the first direction, a lens barrel aligned with the hollow and seated within the frame; and at least one lens disposed within in the lens barrel, wherein the lens barrel comprises a cylindrical lower portion having a diameter greater than the at least one lens, an extension portion extending from a top surface of the lower portion in a direction oblique to the first direction, a cylindrical upper portion extending from a top surface of the extension portion in the first direction and having a diameter smaller than the lower portion, and wherein a distance from the top surface of the lower portion to the bottom surface of the first portion is smaller than a distance from a top surface of the upper portion to a bottom surface of the window.

In addition, an electronic device according to certain embodiments may include at least one actuator disposed within the frame and configured to change a position of the at least one lens, a driver integrated circuit (IC) disposed within the frame and configured to drive the at least one actuator, a sensor module disposed within the frame and configured to detect motion of the camera assembly, and a processor operatively connected to the sensor module and the driver IC, wherein the processor is configured to detect the motion of the camera assembly from the sensor module as sensor information, determine, based on the sensor information, whether the camera assembly is falling, and when it is determined that the camera assembly is falling, drive the at least one actuator through the driver IC to change the position of the at least one lens.

According to certain embodiments, when the electronic device falls, the lens barrel and the structure for supporting the window may collide first, and this structure may prevent the camera lens and the window from colliding with each other.

Besides, various advantageous effects directly or indirectly inferable from this document may be provided.

BRIEF DESCRIPTION OF THE DRAWINGS

The above and other aspects, features, and advantages of certain embodiments of the disclosure will be more apparent from the following description taken in conjunction with the accompanying drawings, in which.

In describing the drawings, identical or similar reference numerals may be used to designate identical or similar constituent elements.

DETAILED DESCRIPTION

Figure 1:
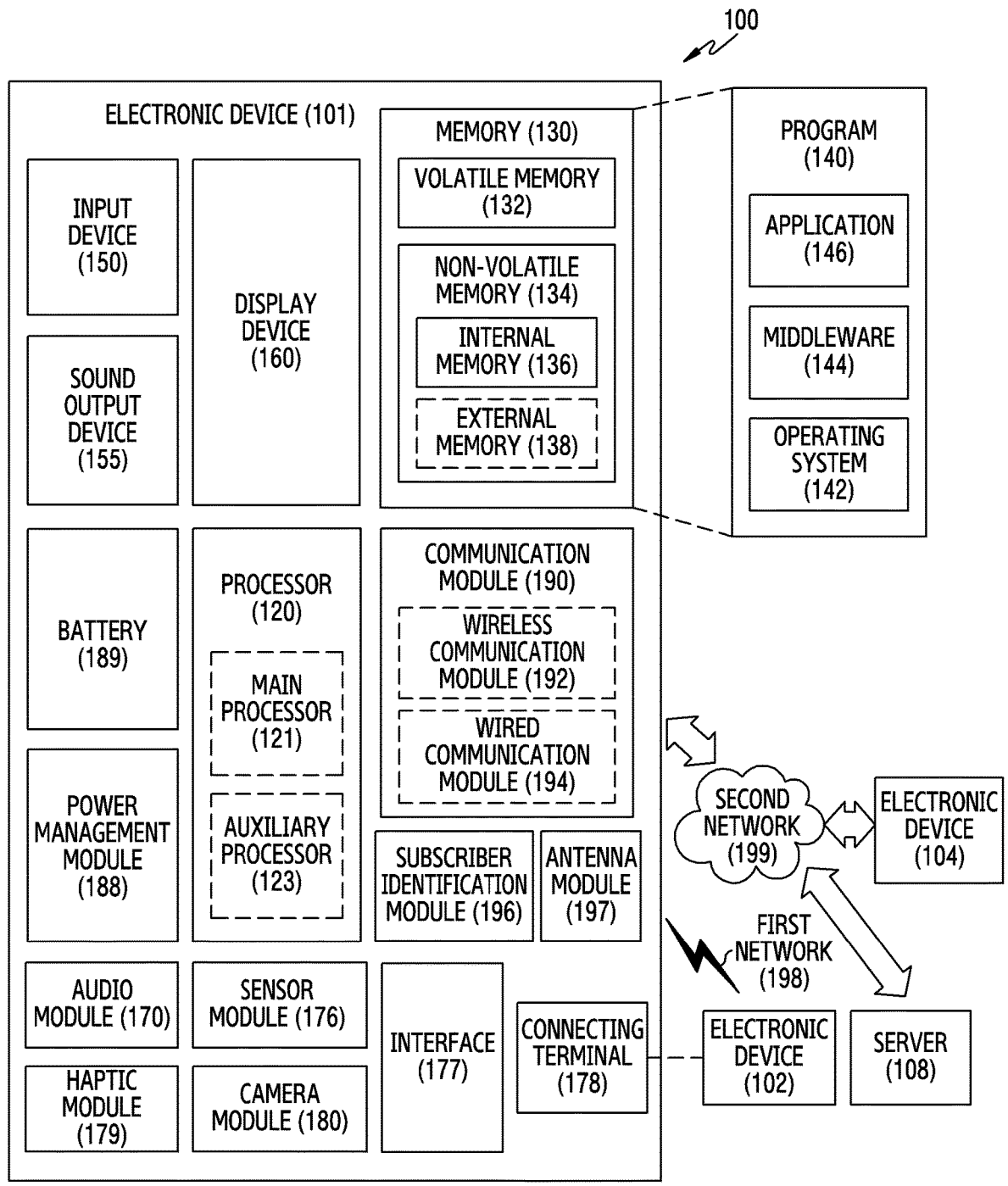
FIG. 1 is block diagram of an electronic device in a network environment according to certain embodiments.

Hereinafter, certain embodiments will be described with reference to the accompanying drawings. For convenience of description, the sizes of elements illustrated in the drawings may be enlarged or reduced, and the disclosure is not necessarily limited to the illustrated sizes.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
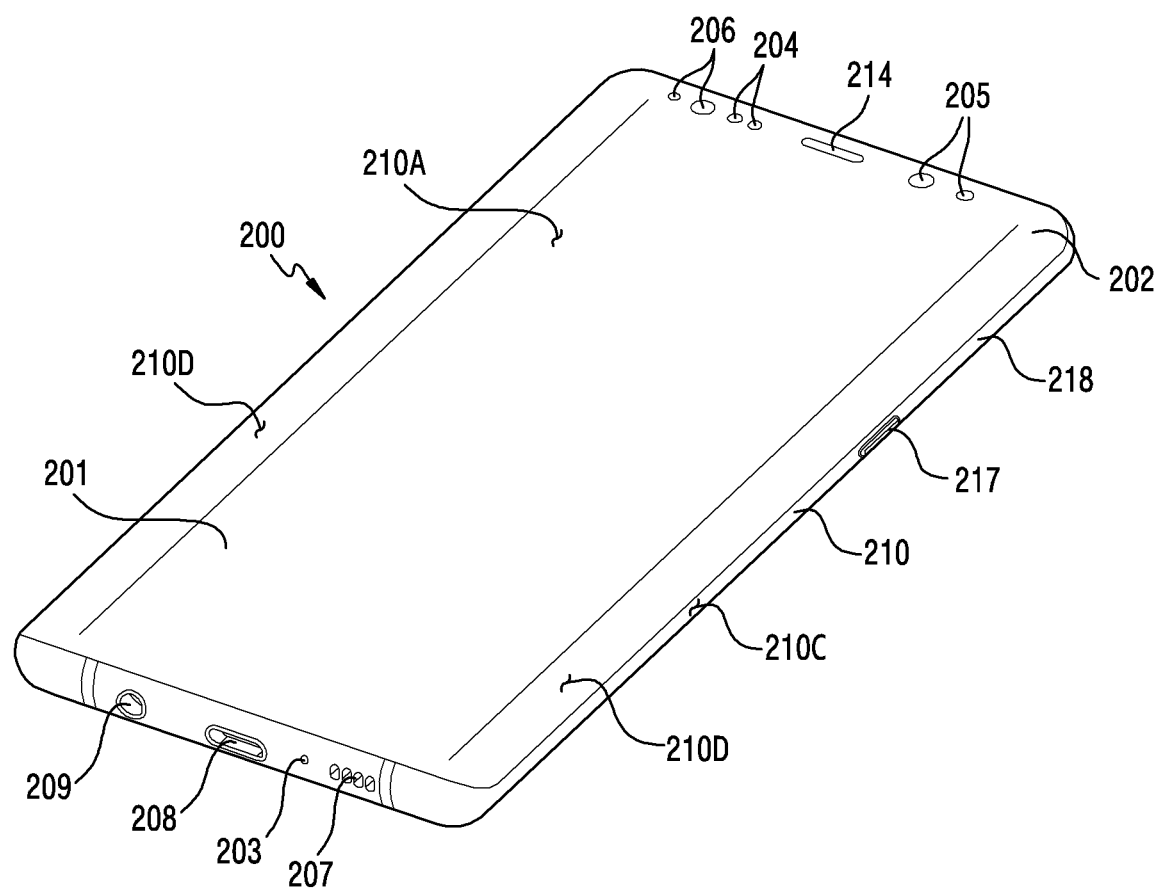
FIG. 2A is a perspective view showing the front of an electronic device according to certain embodiments.
Figure 2B:
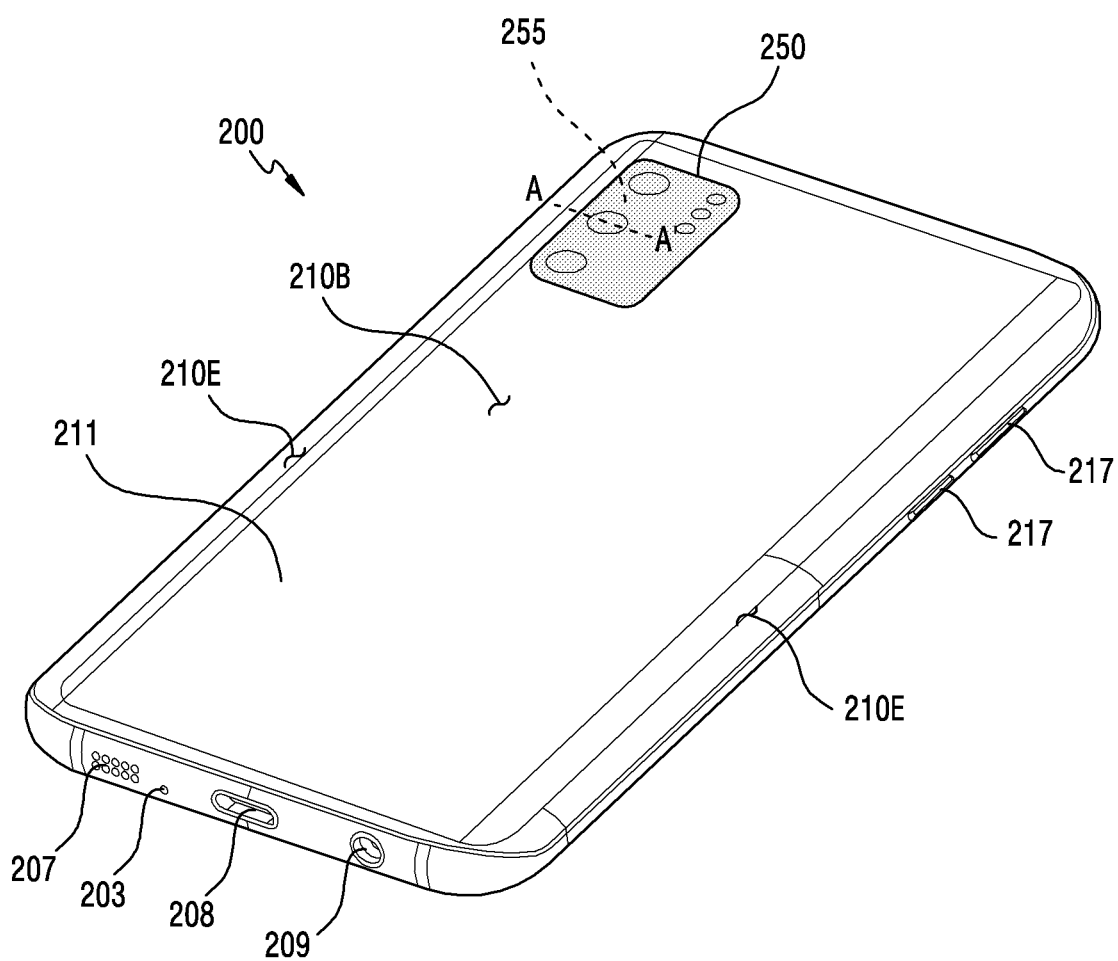
FIG. 2B is a perspective view showing the rear of the electronic device illustrated in FIG. 2A.

FIG. 2A is a perspective view of the front of an electronic device 200 (e.g., the electronic device 101 in FIG. 1) according to certain embodiments. FIG. 2B is a perspective view of the rear of the electronic device 200 illustrated in FIG. 2A.

Referring to FIGS. 2A and 2B, the electronic device 200 according to an embodiment may include a housing 210 including a first surface (or a front surface) 210A, a second surface (or a rear surface) 210B, and a side surface 210C surrounding the space between the first surface 210A and the second surface 210B. In another embodiment (not shown), the housing may refer to a structure which forms some of the first surface 210A and the side surface 210C in FIG. 2A and the second surface 210B in FIG. 2B. According to an embodiment, the first surface 210A is a front plate 202, at least a part of which is substantially transparent, and may be formed of a polymer plate or a glass plate including various coating layers. In another embodiment, the front plate 202 may be coupled to the housing 210 so as to form an inner space together with the housing 210. In certain embodiments, the "inner space" may refer to the inner space of the housing 210, which is a space for receiving at least a portion of a display 201.

According to certain embodiments, the second surface 210B may be formed of a substantially opaque rear plate 211. The rear plate 211 may be formed of, for example, coated or colored glass, ceramic, polymer, metal (e.g., aluminum, stainless steel (STS), or magnesium), or a combination of at least two of the above-described materials. The side surface 210C is coupled to the front plate 202 and the rear plate 211, and may be formed of a side bezel structure (or "a side member") 218 which contains metal and/or polymer. In certain embodiments, the rear plate 211 and the side bezel structure 218 may be integrally formed, and may contain the same material (e.g., a metal material such as aluminum).

In an illustrated embodiment, the front plate 202 may include two first regions 210D (e.g., curved regions), which are provided at both ends of the long edge of the front plate 202 and are curved and seamlessly extend from the first surface 210A toward the rear plate 211. In an illustrated embodiment, the rear plate 211 may include two second regions 210E (e.g., curved regions), which are provided at both ends of the long edge thereof and are curved and seamlessly extend from the second surface 210B toward the front plate 202. In certain embodiments, the front plate 202 (or the rear plate 211) may in some embodiments include one of the first regions 210D (or the second regions 210E), singly. In another embodiment, some of the first regions 210D or the second regions 210E may not be included. In the above-described embodiments, when the electronic device 200 is seen from the side thereof, the side bezel structure 218 may have a first thickness (width) at a side surface that does not include the first regions 210D or the second regions 210E (e.g., a side surface in which a connector hole 208 is formed), and may have a second thickness, which is smaller than the first thickness, at a side surface that includes the first regions 210D or the second regions 210E (e.g., a side surface on which a key input device 217 is disposed).

According to an embodiment, the electronic device 200 may include at least one among a display 201, audio modules 203, 207, and 214, a sensor module 204, camera modules 205 and 255, key input devices 217, a light-emitting element 206, and connector holes 208 and 209. In certain embodiments, in the electronic device 200, at least one of the above-described elements (e.g., the key input devices 217 or the light-emitting element 206) may be omitted, or another element may be additionally included.

The display 201 may be exposed through, for example, a considerable portion of the front plate 202. In certain embodiments, the display 201 may be at least partially exposed through the front plate 202 that forms the first surface 210A and the first regions 210D of the side surface 210C. In certain embodiments, the edge of the display 201 may be formed to have a shape mostly identical to the shape of the outer edge of the front plate 202 adjacent thereto. In another embodiment (not shown), in order to increase the exposed area of the display 201, the gaps between the outer edges of the display 201 and the outer edges of the front plate 202 may be formed to be approximately equal to each other.

In another embodiment (not shown), a recess or an opening is formed in a part of a screen display region (e.g., an active region) of the display 201 or a region other than the screen display region (e.g., an inactive region), and the electronic device may include at least one of the audio module 214, the sensor module 204, the camera modules 205 and 255, and the light-emitting element 206, aligned with the recess or the opening. In another embodiment (not shown), at least one of the audio module 214, the sensor module 204, the camera module 205 or 255, and the light-emitting element 206 may be included on the rear surface of the screen display region of the display 201. In another embodiment (not shown), the display 201 may be coupled to or disposed adjacent to a touch-sensing circuit, a pressure sensor capable of measuring the strength (pressure) of touch, and/or a digitizer for detecting a stylus pen using a magnetic field. In an embodiment, at least some of the sensor modules 204 and/or at least some of the key input devices 217 may be disposed in the first regions 210D and/or the second regions 210E.

The audio modules 203, 207, and 214 may include a microphone hole 203 and speaker holes 207 and 214. A microphone for acquiring external sound may be disposed in the microphone hole 203, and, in certain embodiments, multiple microphones may be disposed so as to sense the direction of sound. The speaker holes 207 and 214 may include an outer speaker hole 207 and a calling receiver hole 214. In certain embodiments, the speaker holes 207 and 214 and the microphone hole 203 may be implemented as one hole, or a speaker (e.g., a Piezo speaker) may be included without the speaker holes 207 and 214.

The sensor module 204 may generate an electrical signal or data value, which corresponds to an operational state inside the electronic device 200 or an environment state outside the electronic device 200. The sensor module 204 may include, for example, a first sensor module 204 (e.g., a proximity sensor) and/or a second sensor module (not shown) (e.g., a fingerprint sensor), disposed in the first surface 210A of the housing 210, and/or another sensor module (not shown) (e.g., an HRM sensor or a fingerprint sensor), disposed in the second surface 210B of the housing 210. The fingerprint sensor may be disposed not only in the first surface 210A (e.g., the display 201) of the housing 210 but also in the second surface 210B of the housing 210. The electronic device 200 may further include at least one of sensor modules that are not shown, for example, a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor 204.

The camera modules 205 and 255 may include a first camera device 205 disposed in the first surface 210A of the electronic device 200, and a second camera device 255 disposed in the second surface 210B. The second camera device 255 may include, for example, a first component (e.g., an infrared light source), a second component (e.g., an infrared receiver), a flicker detection sensor, and/or multiple cameras. Each of the camera modules 205 and 255 may include one or multiple lenses, an image sensor, and/or an image signal processor. A flash (not shown) may be disposed on the second surface 210B. The flash may include, for example, a light-emitting diode or a xenon lamp. In certain embodiments, two or more lenses (an infrared camera, wide-angle and telephoto lenses) and image sensors may be disposed in one surface of the electronic device 200.

According to an embodiment, in the second camera device 255, a portion of the second camera device 255, exposed to the outside, may be covered with a decorative member 250 (e.g., a camera decoration) disposed on the second surface 210B. The decorative member 250 may include, for example, a structure (or a frame) covering the second camera device 255. In an embodiment, in the first camera device 205, a portion of the first camera device 205, exposed to the outside, may also be covered with another decorative member disposed on the first surface 210A.

The key input devices 217 may be disposed on the side surface 210C of the housing 210. In another embodiment, the electronic device 200 may not include some or all of the above-described key input devices 217. The key input devices 217 that are not included in the electronic device 200 may be implemented in other forms, such as a soft key, on the display 201.

The light-emitting element 206 may be disposed, for example, in the first surface 210A of the housing 210. The light-emitting element 206 may provide, for example, state information of the electronic device 200 in a light form. In another embodiment, the light-emitting element 206 may provide, for example, a light source operating in conjunction with the operation of the camera module 205. The light-emitting element 206 may include, for example, an LED, an IR LED, and a xenon lamp.

The connector holes 208 and 209 may include a first connector hole 208 capable of receiving a connector (e.g., a USB connector) for transmitting or receiving power and/or data to or from an external electronic device, and/or a second connector hole (e.g., an earphone jack) 209 capable of receiving a connector for transmitting or receiving an audio signal to or from an external electronic device.

Figure 3:
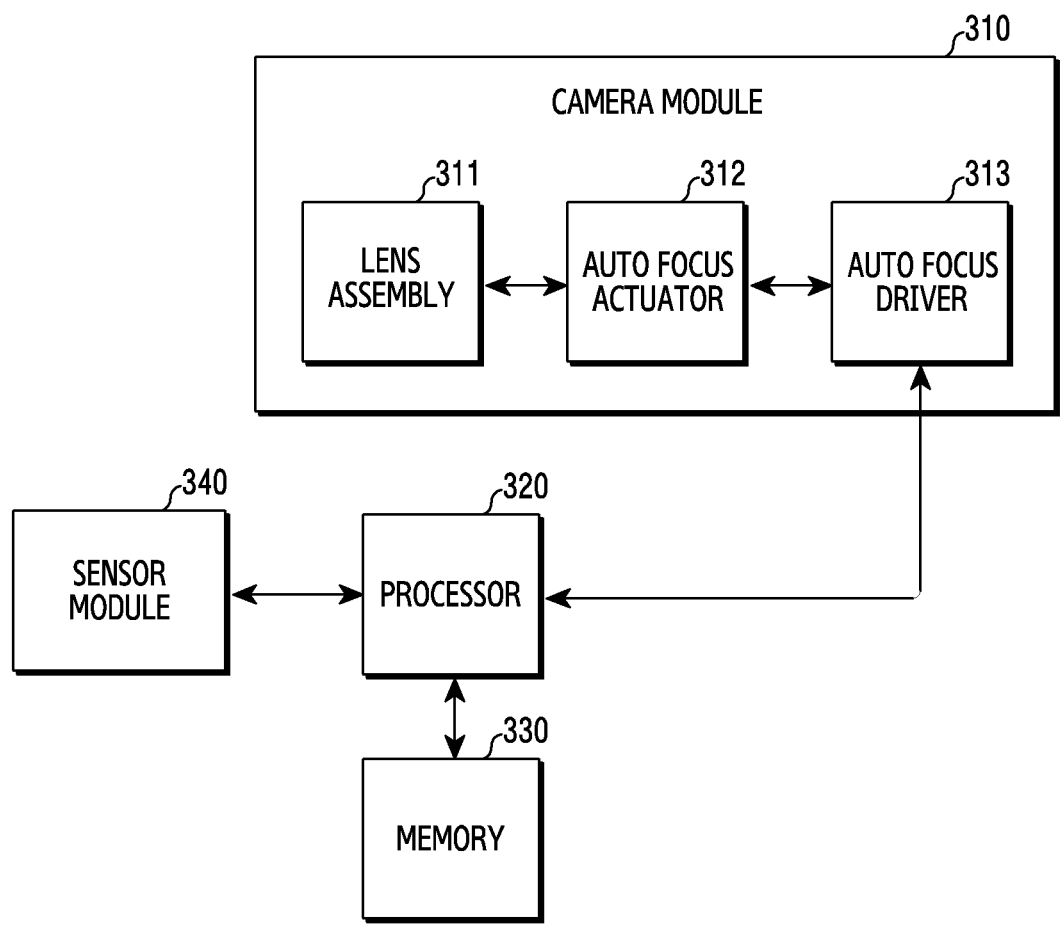
FIG. 3 is a view for describing the configuration of a camera assembly or an electronic device including the camera assembly according to an embodiment.

FIG. 3 is a view for describing the configuration of a camera assembly or an electronic device including the camera assembly according to an embodiment.

Referring to FIG. 3, a camera assembly or an electronic device including the camera assembly (e.g., the electronic device 101 in FIG. 1 or the electronic device 200 in FIGS. 2A and 2B) may include a camera module 310 (e.g., the camera module 180 in FIG. 1 or the camera modules 205 and 255 in FIGS. 2A and 2B), a processor 320 (e.g., the processor 120 in FIG. 1), a memory 330 (e.g., the memory 130 in FIG. 1), and a sensor module 340 (e.g., the sensor module 176 in FIG. 1 or the sensor module 204 in FIG. 2A). However, the elements of the device are not limited thereto. According to certain embodiments, in the camera assembly or the electronic device including the camera assembly, at least one of the above-described elements may be omitted, and at least one other element may be further included. According to an embodiment, the camera assembly or the electronic device including the camera assembly may further include a display (e.g., the display device 160 in FIG. 1 or the display 201 in FIG. 2A).

The camera module 310 may include a lens assembly 311, an auto focus (AF) actuator 312, and an AF driver 313. However, elements of the camera module 310 are not limited thereto. According to certain embodiments, in the camera module 310, at least one of the above-described elements may be omitted, and at least one other element may be further included. According to an embodiment, the camera module 310 may further include an image stabilizer actuator, an image stabilizer driver, and a flash. Further, although not illustrated, the camera module 310 may include an image sensor, an image signal processor, or a buffer memory.

The lens assembly 311 may collect light emitted from a subject, the image of which is to be captured. The lens assembly 311 may include one or more lenses. According to an embodiment, the camera module 310 may include multiple lens assemblies 311. Some of the multiple lens assemblies 311 have the same lens properties (e.g., the field of view, a focal length, autofocus, f-number, or optical zoom), or at least one lens assembly has one or more lens properties that are different from the lens properties of the other lens assemblies. The lens assembly 311 may include, for example, a wide-angle lens or a telephoto lens. The lens assembly 311 may include a lens barrel and a spacer for seating and fixing at least one lens.

The flash may emit light which is to be used to strengthen light emitted from or reflected by a subject. According to an embodiment, the flash may include at least one light-emitting diode (e.g., a red-green-blue (RGB) LED, a white LED, an infrared LED, or an ultraviolet LED) or a xenon lamp.

The image sensor may convert light, which has been emitted or reflected by a subject and has been transferred through the lens assembly 311, into an electrical signal so as to acquire an image corresponding to the subject. According to an embodiment, the image sensor may include, for example, one image sensor selected from among image sensors having different properties, such as an RGB sensor, a black and white (BW) sensor, an IR sensor, or a UV sensor, multiple image sensors having the same properties, or multiple image sensors having different properties. Each image sensor included in the image sensor may be implemented using, for example, a charged coupled device (CCD) sensor or a complementary metal oxide semiconductor (CMOS) sensor.

The AF actuator 312 may move at least one lens included in the lens assembly 311 to an appropriate position such that the camera module 310 is capable of performing auto-focusing normally. The AF actuator 312 may move the at least one lens to the center point in a Z-axis direction. Herein, the Z-axis direction may be the direction of a center axis of the lens assembly 311, i.e., the direction of the center axis of a lens barrel on which at least one lens is seated. For example, the AF actuator 312 may move the position of the at least one lens in the downward/upward direction. According to an embodiment, the AF actuator 312 may include a voice coil motor.

The AF driver 313 may control the driving of the AF actuator 312. For example, the AF driver 313 may control a driving current applied to the AF actuator 312. According to an embodiment, the AF driver 313 may be provided in the form of an integrated circuit (IC).

In response to the motion of the camera assembly or the electronic device including the same, the image stabilizer actuator may move at least one lens, included in the lens assembly 311, or the image sensor in a specific direction, or may control the operation characteristics of the image sensor (e.g., may adjust read-out timing). This may at least partially compensate for a negative effect of the motion (e.g., hand shake) on a captured image. According to an embodiment, the image stabilizer actuator may move the at least one lens to the center point in an X-axis direction and/or Y-axis direction. Herein, the X-axis direction and the Y-axis direction are directions perpendicular to the Z-axis direction, and may be directions toward the center axis of the lens assembly 311, that is, directions toward the center axis of a lens barrel on which at least one lens is seated. For example, the image stabilizer actuator may move the at least one lens in the leftward/rightward direction. According to an embodiment, the image stabilizer actuator may include a voice coil motor. According to an embodiment, the image stabilizer actuator may sense the motion of the camera assembly and the electronic device by using a sensor module 340 (e.g., a gyro sensor or an acceleration sensor) disposed inside or outside of the camera assembly. According to an embodiment, the image stabilizer actuator may be implemented as, for example, an optical image stabilizer (OIS) actuator.

The image stabilizer driver may control the driving of the image stabilizer actuator. For example, the image stabilizer driver may control a driving current applied to the image stabilizer actuator. According to an embodiment, the image stabilizer driver may be provided in the form of an integrated circuit.

The buffer memory may at least temporarily store at least a part of an image, acquired through the image sensor, for the next image processing operation. For example, when image acquisition according to a shutter is delayed or multiple images are acquired at high speed, an acquired original image (e.g., a Bayer-patterned image or a high-quality image) may be stored in the buffer memory, and a copied image (e.g., a low-quality image) corresponding thereto may be displayed (or previewed) through the display. Thereafter, if a designated condition is satisfied (e.g., a user input or system command), at least a part of the original image stored in the buffer memory may be acquired and processed by, for example, an image signal processor. According to an embodiment, the buffer memory may be formed as a part of the memory 330 or as a separate memory which is independently operated.

The image signal processor may perform one or more types of image processing with respect to the image acquired through the image sensor or the image stored in the buffer memory. The one or more types of image processing may include, for example, depth map generation, three-dimensional modeling, panorama generation, feature point extraction, image synthesis, or image compensation (e.g., noise reduction, resolution adjustment, brightness adjustment, blurring, sharpening, or softening). Additionally or alternatively, the image signal processor may control at least one (e.g., the image sensor) of the elements included in the camera module 310 (e.g., may control exposure time or read-out timing). The image processed by the image signal processor may be stored in the buffer memory again in order to be additionally processed, or may be provided to an element outside the camera module 310 (e.g., the memory 330, the display, the external electronic device (e.g., the electronic device 102 and 104 or the server 108 in FIG. 1)). According to an embodiment, the image signal processor may be formed as a part of the processor 320 or as a separate processor which is independently operated. When the image signal processor is formed as a processor which is separate from the processor 320, at least one image processed by the image signal processor may be displayed through the display as it is or after being additionally processed by the processor 320.

The processor 320 may control at least one other element of the camera assembly or the electronic device, and may process or calculate various data. The processor 320 may execute commands stored in the memory 330.

According to an embodiment, the processor 320 may acquire sensor information from the sensor module 340. The sensor information may include, for example, a sensor value according to the motion of the camera assembly or the electronic device. The sensor value may include, for example, acceleration values of the camera assembly or the electronic device in the X-axis, Y-axis, and Z-axis directions. In this case, the processor 320 may determine, based on the sensor information, whether the camera assembly or the electronic device is falling. For example, when the time, during which the acceleration in the Z-axis direction maintains a value equal to or greater than a designated value, exceeds a designated time, the processor 320 may determine that the camera assembly or the electronic device is falling.

According to an embodiment, when it is determined that the camera assembly or the electronic device is falling, the processor 320 may adjust the position of at least one lens included in the lens assembly 311. For example, the processor 320 may adjust the position of the at least one lens by using at least one of the AF actuator 312 or the image stabilizer actuator. In one example, the processor 320 may move, using the AF actuator 312, the position of the at least one lens in the upward/downward direction, thereby fixing the position of the at least one lens to the center point in the Z-axis direction (e.g., code 250 when the full range is code 512). In another example, the processor 320 may move, using the image stabilizer actuator, the position of the at least one lens in the leftward/rightward direction, thereby fixing the position of the at least one lens to the center point in the X-axis direction and/or the Y-axis direction (e.g., a point at which the X-axis (or Y-axis) crosses the center axis of the lens barrel). In another example, the processor 320 may move, using the AF actuator 312 and the image stabilizer actuator, the position of the at least one lens in the upward, downward, leftward, and rightward directions, thereby fixing the position of the at least one lens to the center point in the X-axis direction, the Y-axis direction, and the Z-axis direction.

The memory 330 may store various data used by at least one element of the camera assembly or the electronic device. According to an embodiment, the memory 330 may store data and commands related to controlling the camera module 310, the sensor module 340, the memory 330, and the display.

The sensor module 340 may generate an electrical signal or a data value (sensor value) corresponding to the state of motion of the camera assembly or the electronic device. According to an embodiment, the sensor module 340 may include at least one of a gyro sensor or an acceleration sensor.

The display may display various types of contents (e.g., a text, an image, a video, an icon, or a symbol) to a user. The display may include a touchscreen, and may receive touch, gesture, proximity, or hovering input using, for example, an electronic pen or a portion of the user's body.

According to an embodiment, the camera assembly or the electronic device may include multiple camera modules 310 having different properties or functions. In this case, for example, at least one of the multiple camera modules 310 may be a wide-angle camera, and at least one other camera thereof may be a telephoto camera. Similarly, at least one of the multiple camera modules 310 may be a front camera, and at least one other camera may be a rear camera.

Figure 4:
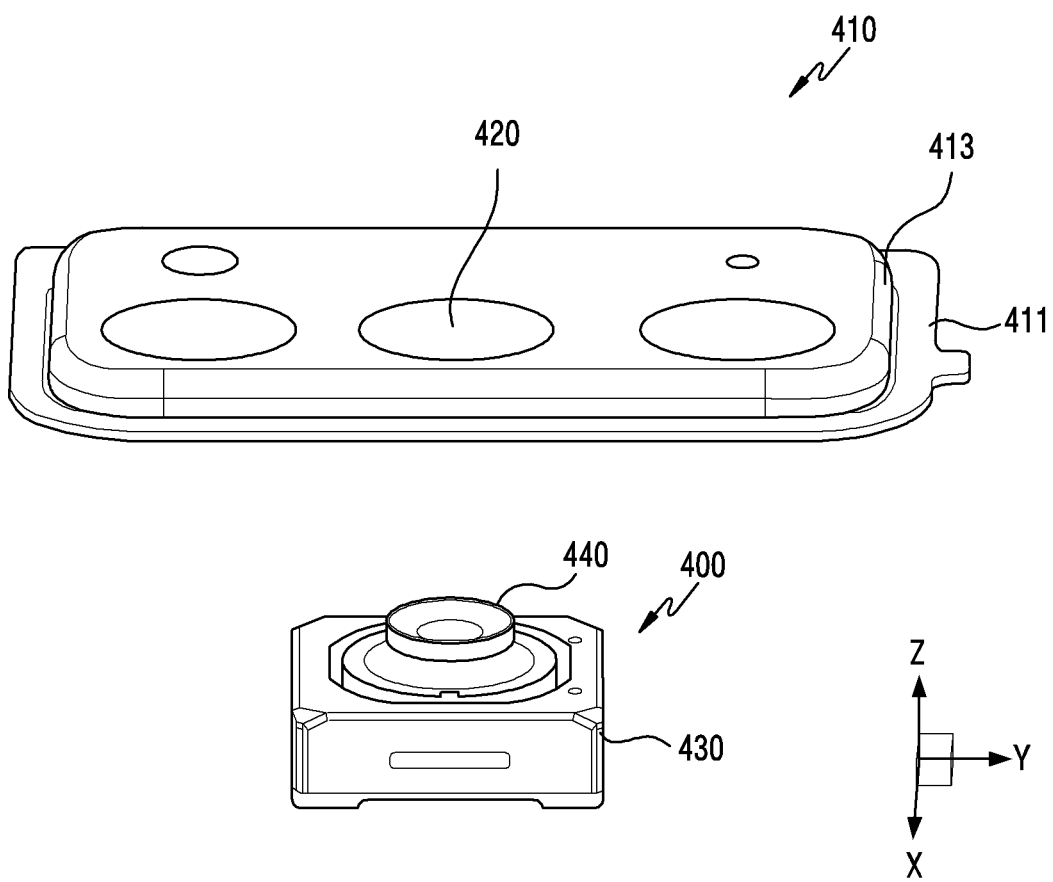
FIG. 4 is a view for describing a camera module and a decorative member according to an embodiment.
Figure 5:
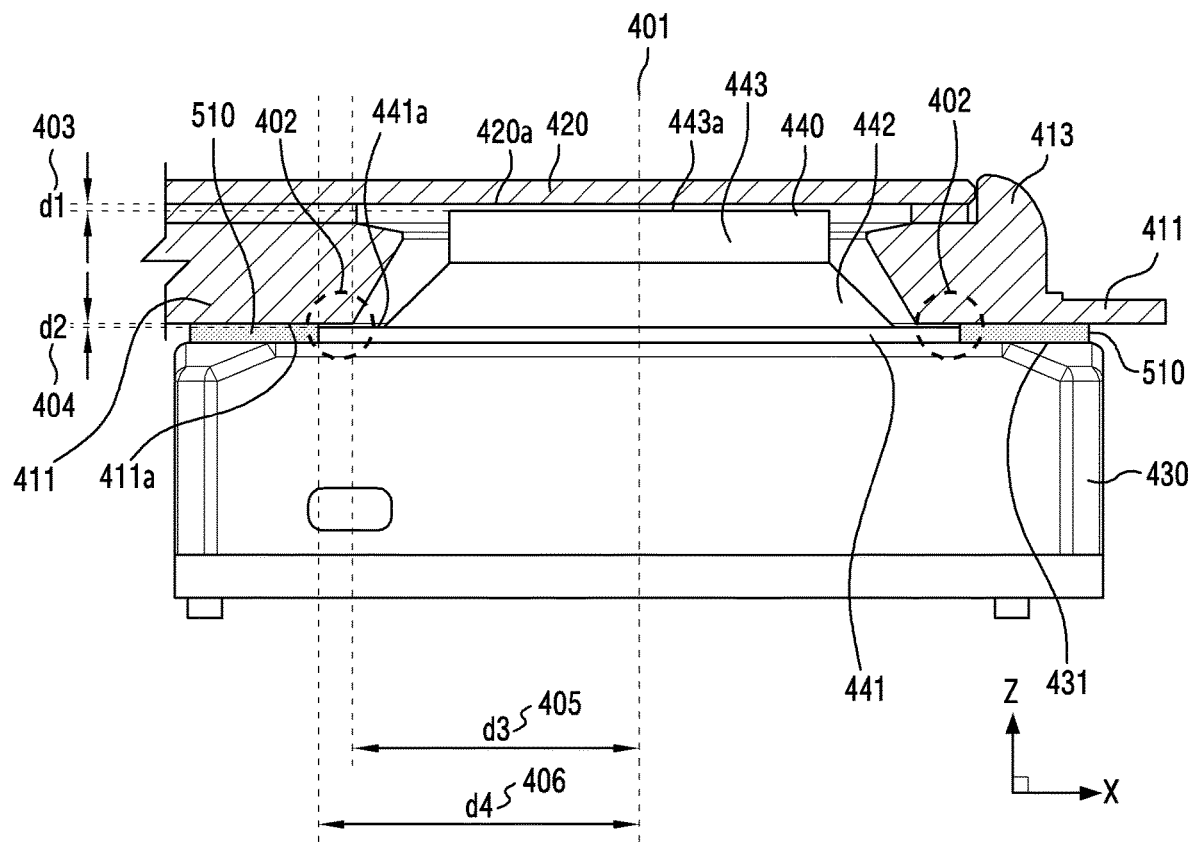
FIG. 5 is a cross-sectional view of a camera module and a decorative member, fastened to each other, according to an embodiment.

FIG. 4 is a view illustrating an example camera module and a decorative member according to an embodiment, and FIG. 5 is a cross-sectional view of a camera module and a decorative member, fastened to each other, according to an embodiment. The cross-sectional view in FIG. 5 may correspond to a cross-sectional view taken along line A-A' in FIG. 2B. In some embodiments, the "decorative" member may be referred to as a "housing" member, which includes a decorative facade for the camera module, but may also include structural elements.

Referring to FIGS. 4 and 5, an electronic device (e.g., the electronic device 101 in FIG. 1 or the electronic device 200 in FIGS. 2A and 2B) including a camera assembly may include a camera module 400 (e.g., the camera module 180 in FIG. 1 or the camera modules 205 and 255 in FIGS. 2A and 2B), and a decorative member 410 (or a structure) (e.g., the decorative member 250 in FIG. 2B) which covers the camera module 400 from the front direction (Z-axis direction) to prevent foreign matter from infiltrating into the camera module 400.

The electronic device may include a housing including a first surface (e.g., a front surface) facing a first direction (e.g., a front direction, (+) Z-axis direction), a second surface (e.g., a rear surface) facing a second direction (e.g., a front direction, (−) Z-axis direction) opposite to the first direction, and a side surface at least partially surrounding the space formed between the first surface and the second surface. The camera module 400 may be seated inside the housing, and may be disposed at a position aligned with an opening formed in the first surface. Further, the decorative member 410 may include a first frame 411 connected to the first surface at a position at which the opening is formed, and including a hollow corresponding to the opening, a second frame 413 extending from the first frame 411 in a direction substantially identical to the first direction and surrounding the hollow, and a window (or a window layer) 420 seated in the second frame 413 so as to cover the hollow. According to an embodiment, the first frame 411 and the second frame 413 may be integrated with each other. In this case, the first frame 411 may be a first portion of the decorative member 410, and the second frame 413 may be a second portion of the decorative member 410.

The camera module 400 may include at least one lens (or a lens part) (reference numeral 450 in FIG. 6) and a lens barrel (or a support structure) 440. The lens barrel 440 may fix and support the at least one lens. According to an embodiment, a hollow may be formed in the lens barrel 440, and the at least one lens may be inserted and disposed in the hollow. When multiple lenses are disposed in the lens barrel 440, the multiple lenses may be stacked in multiple layers.

The lens barrel 440 may include a cylindrical lower portion 441 having a larger diameter than the at least one lens, an extension portion 442 extending from the top surface 441a of the lower portion 441 in a direction oblique to the first direction, and a cylindrical upper portion 443 extending from the top surface of the extension portion 442 in the first direction and having a smaller diameter than the lower portion 441. The upper portion 443 may be disposed to be spaced a predetermined distance apart from the window 420. According to an embodiment, the camera module 400 and the decorative member 410 may be mounted such that the distance (d1) 403 between the top surface 443a of the upper portion 443 and the bottom surface 420a of the window 420 is equal to or less than a designated distance (e.g., about 0.1 mm), in consideration of the size of the transparent region (e.g., a printed hole) of the window 420, which serves as an incident path of light, and the size of a structure (e.g., the first frame 411 and the second frame 413) for supporting the window 420.

According to an embodiment, the electronic device may have a structure in which the lens barrel 440 first collides with the decorative member 410 for supporting the window 420 so as to prevent the lens barrel 440, in which the at least one lens has been seated, from colliding with the window 420 when the electronic device falls. This structure may include, for example, a structure in which left and right top ends 402 of the lower portion 441, which correspond to shoulder portions of the lens barrel 440, first collide with the first frame 411 positioned at the lower end of the decorative member 410 when the electronic device falls.

In order for the left and right top ends 402 of the lower portion 441 to first collide with the first frame 411, the distance between left and right top ends 402 of the lower portion 441 and the first frame 411 may be set smaller than the distance between the upper portion 443 of the lens barrel 440 and the window 420. That is, the distance (d2) 404 from the top surface 441a of the lower portion 441 to the bottom surface 411a of the first frame 411 may be set smaller than the distance (d1) 403 from the top surface 443a of the upper portion 443 to the bottom surface 420a of the window 420. Further, when seen from above the window 420, the left and right top ends 402 of the lower portion 441 may at least partially overlap with the first frame 411. That is, the distance (d4) 406 from the center axis 401 of the lens barrel 440 to the side surface of the lower portion 441 may be set larger than the distance (d3) 405 from the center axis 401 of the lens barrel 440 to the bottom surface 411a of the first frame 411.

According to an embodiment, the camera module 400 may further include a third frame 430 which surrounds and seats at least a part of the lens barrel 440. For example, a hollow may be formed in the third frame 430, and the lower portion 441 of the lens barrel 440 may be inserted and seated in the hollow.

According to an embodiment, the electronic device may further include a protective member (or a damping member) 510 disposed at a position at which the left and right top ends 402 of the lower portion 441 of the lens barrel 440 risk collision with the first frame 411 of the decorative member 410. The protective member 510 may reduce the level of shock generated when the left and right top ends 402 of lower portion 441 of the lens barrel 440 collide with the first frame 411 of the decorative member 410. Further, the protective member 510 may prevent foreign matter from entry into the camera module from the side surface of the camera module. According to an embodiment, the protective member 510 may be formed using, or include at least one of a poron or a rubber.

According to an embodiment, the protective member 510 may be disposed between the top surface 431 of the third frame 430, which surrounds the lower portion 441 of the lens barrel 440 in a lateral direction at the left and right top ends 402 of the lower portion 441 of the lens barrel 440 and the bottom surface 411a of the first frame 411 of the decorative member 410. According to another embodiment, the protective member 510 may be disposed between the top surface 441a of the lower portion 441 of the lens barrel 440 and the bottom surface 411a of the first frame 411 of the decorative member 410. According to another embodiment, the protective member 510 may be disposed between the top surface 431 of the third frame 430 and the bottom surface 411a of the first frame 411 of the decorative member 410 in a lateral direction at the left and right top ends 402 of the lower portion 441 of the lens barrel 440 and between the top surface 441a of the lower portion 441 of the lens barrel 440 and the bottom surface 411a of the first frame 411 of the decorative member 410.

The compression ratio of the protective member 510 in the first direction may be equal to or smaller than a designated value. For example, when the compression ratio in the first direction reaches a threshold, the strain of the protective member 510 may rapidly increase, and thus the protective member 510 may not be compressed. According to an embodiment, a value obtained by multiplying the thickness of the protective member 510 in the first direction and the compression ratio may be smaller than the distance 403 between the top surface 443a of the upper portion 443 of the lens barrel 440 and the bottom surface 420a of the window 420. In one example, if the distance 403 between the top surface 443a of the upper portion 443 of the lens barrel 440 and the bottom surface 420a of the window 420 is 0.1 mm and the compression ratio of the protective member 510 in the first direction is 0.3 (30%), it is desirable that the thickness of the protective member 510 in the first direction be about 0.3 mm (0.3 mm*0.3=0.09 mm<0.1 mm). That is, the protective member 510 may be provided so as to maintain the minimum gap between the top surface 443a of the upper portion 443 of the lens barrel 440 and the bottom surface 420a of the window 420 with reference to the maximum compression amount.

The camera module 400 may be connected to a processor (e.g., the processor 120 in FIG. 1), and the processor may be connected to a memory (e.g., the memory 130 in FIG. 1). According to an embodiment, the processor and the memory may be disposed inside the third frame 430. According to an embodiment, at least one actuator (e.g., the AF actuator 312 or the OIS actuator), capable of changing the position of at least one lens included in the lens barrel 440, and a driver (e.g., the AF driver 313 or the OIS driver), configured to drive the at least one actuator, may be further disposed inside the third frame 430.

In the above description, the camera module 400 and the decorative member 410 have been described as elements which are disposed in the housing of the electronic device or are connected to a portion of the housing. However, the camera module 400 and the decorative member 410 may be formed as independent elements constituting a camera assembly.

According to an embodiment, the camera assembly may include a first frame 411 which includes a hollow, a second frame 413 which extends from the first frame 411 in a first direction (e.g., a front direction, (+) Z-axis direction) and surrounds the hollow, a third frame 430 which is disposed in a second direction (e.g., a rear direction, (−) Z-axis direction) opposite to the first direction while being spaced a predetermined distance apart from a bottom surface 411a of the first frame 411, a lens barrel 440 which is disposed at a position aligned with the hollow and is seated inside the third frame 430, a window 420 which is seated in the second frame 413 so as to cover the hollow, and at least one lens (reference numeral 450 in FIG. 6) which is disposed inside the lens barrel 440. Hereinafter, the first frame 411, the second frame 413, the third frame 430, and the window 420 may form the external appearance of the camera assembly. According to an embodiment, the first frame 411, the second frame 413, and the third frame 430 may be integrally formed. In this case, the first frame 411 may be a first portion of a housing of the camera assembly, the second frame 413 may be a second portion of the housing of the camera assembly, and the third frame 430 may be a third portion of the housing of the camera assembly.

The lens barrel 440 of the camera assembly may include elements identical or similar to those of the lens barrel 440 of the electronic device. For example, the lens barrel 440 of the camera assembly may include a cylindrical lower portion 441 having a diameter larger than the at least one lens, an extension portion 442 extending from the top surface 441a of the lower portion 441 in a direction oblique to the first direction, and a cylindrical upper portion 443 extending from the top surface of the extension portion 442 in the first direction and having a smaller diameter than the lower portion 441.

Further, in the camera assembly, when the camera assembly falls, left and right top ends 402 of the lower portion 441 of the lens barrel 440 may first collide with the first frame 411 so as to prevent the lens barrel 440, in which the at least one lens has been seated, from colliding with the window 420. To this end, the distance (d2) 404 from the top surface 441a of the lower portion 441 to the bottom surface 411a of the first frame 411 may be set smaller than the distance (d1) 403 from the top surface 443a of the upper portion 443 to the bottom surface 420a of the window 420. Further, the distance (d4) 406 from the center axis 401 of the lens barrel 440 to the side surface of the lower portion 441 may be set larger than the distance (d3) 405 from the center axis 401 of the lens barrel 440 to the bottom surface 411a of the first frame 411.

According to an embodiment, the camera assembly may further include a protective member 510 which is disposed at a position at which the left and right top ends 402 of the lower portion 441 of the lens barrel 440 are at risk of colliding with the first frame 411. The protective member 510 may reduce the level of shock generated when the left and right top ends 402 of lower portion 441 of the lens barrel 440 collide with the first frame 411.

According to an embodiment, the protective member 510 may be disposed between the top surface 431 of the third frame 430 and the bottom surface 411a of the first frame 411 in a lateral direction at the left and right top ends 402 of the lower portion 441 of the lens barrel 440. According to another embodiment, the protective member 510 may be disposed between the top surface 441a of the lower portion 441 of the lens barrel 440 and the bottom surface 411a of the first frame 411. According to another embodiment, the protective member 510 may be disposed between the top surface 431 of the third frame 430 and the bottom surface 411a of the first frame 411 in a lateral direction at the left and right top ends 402 of the lower portion 441 of the lens barrel 440 and between the top surface 441a of the lower portion 441 of the lens barrel 440 and the bottom surface 411a of the first frame 411.

According to an embodiment, the camera assembly may include a processor (e.g., the processor 120 in FIG. 1) and a memory (e.g., the memory 130 in FIG. 1). The processor and the memory may be disposed inside the third frame 430.

According to an embodiment, at least one actuator (e.g., the AF actuator 312 or the OIS actuator), capable of changing the position of at least one lens included in the lens barrel 440, and a driver (e.g., the AF driver 313 or the OIS driver), configured to drive the at least one actuator, may be further disposed inside the third frame 430.

Figure 6:
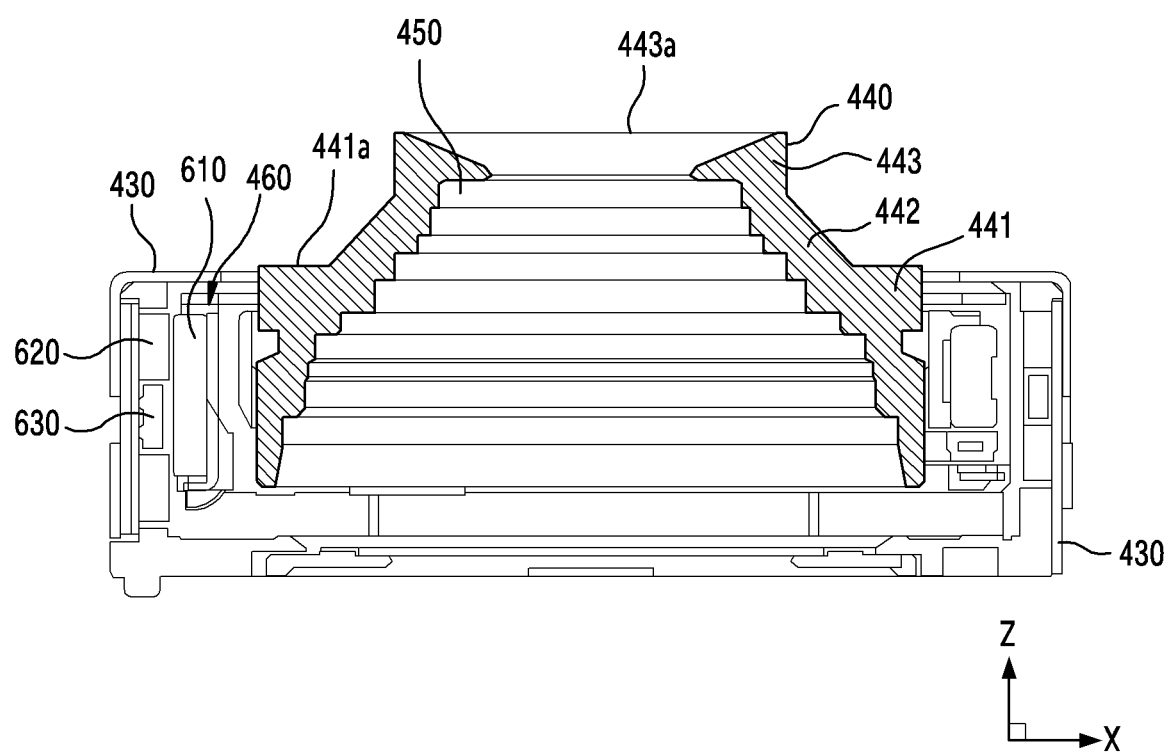
FIG. 6 is a view for describing the configuration of a camera module according to an embodiment.

FIG. 6 is a view for describing the configuration of a camera module according to an embodiment. The cross-sectional view in FIG. 6 may correspond to a cross-sectional view of the camera module 400 in FIG. 4, taken along the Z-axis direction in in FIG. 4.

Referring to FIG. 6, the camera module 400 (e.g., the camera module 180 in FIG. 1 or the camera modules 205 and 255 in FIGS. 2A and 2B) may include at least one lens 450, a lens barrel 440, and a frame 430. The lens barrel 440 may affix and support the at least one lens 450. According to an embodiment, a hollow may be formed in the lens barrel 440, and the at least one lens 450 may be inserted and disposed in the hollow. When multiple lenses 450 are disposed in the lens barrel 440, the multiple lenses 450 may be stacked in multiple layers.

The lens barrel 440 may include a cylindrical lower portion 441 having a diameter larger than the at least one lens 450, an extension portion 442 extending from the top surface of the lower portion 441 in a direction oblique to the first direction (e.g., (+) Z-axis direction), and a cylindrical upper portion 443 extending from the top surface of the extension portion 442 in the first direction and having a diameter smaller than the lower portion 441.

The frame 430 may form at least a portion of a housing of the camera module 400. The frame 430 may seat the lens barrel 440 while surrounding at least a portion of the lens barrel 440. For example, a hollow may be formed in the frame 430, and the lower portion 441 of the lens barrel 440 may be inserted and seated in the hollow.

A movement restriction member 460 (e.g., a stopper) may be disposed within the frame 430. The movement restriction member 460 may restrict the movement of the lens barrel 440 when the lens barrel 440 moves according to a change in position (e.g., movement) of the at least one lens 450. For example, when the lens barrel 440 moves in the first direction (e.g., (+) Z-axis direction), if the lens barrel 440 moves a predetermined distance or further, the movement restriction member 460 may come into contact with the frame 430, restricting the movement of the lens barrel 440. At least one actuator capable of adjusting (or changing) the position of the at least one lens 450, and a driver 630 configured to drive the at least one actuator may be further disposed within the frame 430. The actuator may include a magnetic material 610 and a voice coil 620.

In order to perform autofocusing of the camera module, the actuator may include at least one of an AF actuator (e.g., the AF actuator 312) configured to adjust the position of the at least one lens 450 and an OIS actuator configured to adjust the position of the at least one lens 450 in response to the motion of the camera module.

According to an embodiment, the actuator may adjust the position of the at least one lens 450 according to control of a processor (e.g., the processor 120 in FIG. 1) when a camera assembly or an electronic device, including the camera module, falls. In one example, the actuator (e.g., AF actuator) may move the position of the at least one lens 450 in the upward/downward direction (e.g., (+, −) Z-axis direction, or the direction of the center axis 401 of the lens barrel 440) to fix the position of the at least one lens 450 to the center point in a Z-axis direction. In another example, the actuator (e.g., the OIS actuator) may move the position of the at least one lens 450 in the leftward/rightward direction (e.g., a (+, −) X-axis direction and/or a (+, −) Y-axis direction (a direction of coming into or out of the drawing)) to fix the position of the at least one lens 450 to the center point in an X-axis direction and/or a Y-axis direction (e.g., a crossing point at which the X-axis (or Y-axis) crosses the center axis 401 of the lens barrel 440). In another example, the actuator (e.g., the AF actuator and the OIS actuator) may move the position of the at least one lens 450 in the upward, downward, leftward, and rightward directions to fix the position of the at least one lens 450 to the center point in the X-axis direction, the Y-axis direction, and the Z-axis direction (e.g., the center direction of the lens barrel 440).

According to an embodiment, when the camera assembly or the electronic device falls, if the position of the at least one lens 450 is moved toward the center of the lens barrel 440, the at least one lens 450 may be prevented from colliding with the inner surface of the lens barrel 440 when the left and right top ends 402 of the lower portion 441, which correspond to shoulder portions of the lens barrel 440, collide with the first frame 411 positioned at the lower end of the decorative member 410. For example, when the at least one lens 450 is positioned away from the center point in the lens barrel 440 and close to the inner surface of the lens barrel 440 in order to perform auto-focusing and prevent hand shake, the at least one lens 450 may collide with the inner surface of the lens barrel 440 by a shock according to the falling. Therefore, the at least one lens 450 may be prevented from colliding with the inner surface of the lens barrel 440 by moving the position of the at least one lens 450 toward the center of the lens barrel 440 to control the at least one lens 450 to be maximally far away from the inner surface of the lens barrel 440. Further, when the camera assembly or the electronic device falls, moving the position of the at least one lens 450 toward the center of the lens barrel 440 can maximally reduce the gap (e.g., air gap) between the at least one lens 450 or the lens barrel 440 and the decorative member 410 at the time of designing the inner structure of the camera assembly or the electronic device.

As described above, according to certain embodiments, an electronic device (e.g., the electronic device 101 or the electronic device 200) may include a housing (e.g., the housing 210), which includes a first surface (e.g., the first surface 210A) facing a first direction, a second surface (e.g., the second 210B) facing a second direction opposite to the first direction, and a side surface (e.g., the side surface 210C) at least partially surrounding the space formed between the first surface and the second surface, a camera module (e.g., the camera module 180, 205, 255, 310, or 400), which is seated inside the housing and is disposed at a position aligned with an opening formed in the first surface, a decorative member (e.g., the decorative member 410), which includes a first portion (e.g., the first frame 411) connected to the first surface at a position at which the opening is formed and including a hollow corresponding to the opening, a second portion (e.g., the second frame 413) extending from the first portion in a direction substantially identical to the first direction and surrounding the hollow, and a window (e.g., the window 420) seated on the second portion so as to cover the hollow, a processor (e.g., the processor 120 or 320) operatively connected to the camera module, and a memory (e.g., the memory 130 or 330) operatively connected to the processor, such that the camera module includes at least one lens (e.g., the lens 450), and a lens barrel (e.g., the lens barrel 440), which includes a cylindrical lower portion (e.g., the lower portion 441) having a larger diameter than the at least one lens, an extension portion (e.g., the extension portion 442) extending from the top surface (e.g., the top surface 441a) of the lower portion in a direction oblique to the first direction, and a cylindrical upper portion (e.g., the upper portion 443) extending from the top surface of the extension portion in the first direction and having a smaller diameter than the lower portion. The distance (e.g., the distance (d2) 404) from the top surface of the lower portion to the bottom surface (e.g., the bottom surface 411a) of the first portion may be smaller than the distance (e.g., the distance (d1) 403) from the top surface (e.g., the top surface 443a) of the upper portion to the bottom surface (e.g., bottom surface 420a) of the window.

According to certain embodiments, the distance (e.g., the distance (d4) 406) from the center axis (e.g., the center axis 401) of the lens barrel to the side surface of the lower portion may be larger than the distance (e.g., the distance (d3) 405) from the center axis of the lens barrel to the bottom surface of the first portion.

According to certain embodiments, the electronic device may further include a protective member (e.g., the protective member 510) disposed between the top surface of the lower portion and the bottom surface of the first portion.

According to certain embodiments, the electronic device may further include a frame (e.g., the third frame 430) configured to seat the lens barrel while surrounding the lower portion, and a protective member (e.g., the protective member 510) disposed between the top surface of the frame and the bottom surface of the first portion.

According to certain embodiments, in the protective member, a compression ratio in the first direction may be equal to or smaller than a predetermined value, and a value obtained by multiplying the thickness of the protective member in the first direction and the compression ratio may be smaller than the distance between the top surface of the upper portion and the bottom surface of the window.

According to certain embodiments, the electronic device may further include at least one actuator (e.g., the auto focus actuator 312) configured to change the position of the at least one lens, a driver IC (e.g., the auto focus driver 313 or the driver 630) configured to drive the at least one actuator, and a sensor module (e.g., the sensor module 176 or 340) configured to sense the motion of the electronic device, such that the processor may be configured to acquire sensor information related to the motion of the electronic device from the sensor module, determine, based on the sensor information, whether the electronic device falls, and when it is determined that the electronic device is falling, drive the at least one actuator through the driver IC to adjust the position of the at least one lens.

According to certain embodiments, the at least one actuator may include a first actuator (e.g., the auto focus actuator 312) configured to adjust the position of the at least one lens in order to perform auto-focusing of the camera module, and a second actuator (e.g., OIS actuator) configured to adjust the position of the at least one lens in response to the motion of the camera module, and when it is determined that the electronic device is falling, the processor may drive the first actuator to move the position of the at least one lens in the direction of the center axis of the lens barrel, and drive the second actuator to move the position of the at least one lens in a direction perpendicular to the center axis of the lens barrel, thereby moving the at least one lens toward the center of the lens barrel.

As described above, according to certain embodiments, a camera assembly may include a decorative member (e.g., the decorative member 410), which includes a first portion (e.g., the first frame 411) including a hollow, a second portion (e.g., the second frame 413) extending from the first portion in a first direction and surrounding the hollow, and a window (e.g., the window 420) seated on the second portion so as to cover the hollow, a frame (e.g., the third frame 430), which is disposed to be spaced a predetermined distance apart from the bottom surface (e.g., the bottom surface 411a) of the first portion in a second direction opposite to the first direction, a lens barrel (e.g., the lens barrel 440), which is disposed at a position aligned with the hollow and is seated inside the frame, and at least one lens (e.g., the lens 450), which is disposed inside in the lens barrel, such that the lens barrel includes a cylindrical lower portion (e.g., the lower portion 441) having a larger diameter than the at least one lens, an extension portion (e.g., the extension portion 442) extending from the top surface (e.g., the top surface 441a) of the lower portion in a direction oblique to the first direction, and a cylindrical upper portion (e.g., the upper portion 443) extending from the top surface of the extension portion in the first direction and having a smaller diameter than the lower portion. The distance (e.g., the distance (d2) 404) from the top surface of the lower portion to the bottom surface of the first portion may be smaller than the distance (e.g., the distance (d1) 403) from the top surface (e.g., the top surface 443a) of the upper portion to the bottom surface (e.g., bottom surface 420a) of the window.

According to certain embodiments, the distance (e.g., the distance (d4) 406) from the center axis (e.g., the center axis 401) of the lens barrel to the side surface of the lower portion may be larger than the distance (e.g., the distance (d3) 405) from the center axis of the lens barrel to the bottom surface of the first portion.

According to certain embodiments, the camera assembly may further include a protective member (e.g., the protective member 510) disposed between the top surface of the lower portion and the bottom surface of the first portion.

According to certain embodiments, the camera assembly may further include a protective member (e.g., the protective member 510) disposed between the top surface of the frame and the bottom surface of the first portion.

According to certain embodiments, in the protective member, a compression ratio in the first direction may be equal to or smaller than a predetermined value, and a value obtained by multiplying the thickness of the protective member in the first direction and the compression ratio may be smaller than the distance between the top surface of the upper portion and the bottom surface of the window.

According to certain embodiments, the camera assembly may further include at least one actuator (e.g., the auto focus actuator 312) disposed inside the frame and configured to change the position of the at least one lens, a driver IC (e.g., the auto focus driver 313) disposed inside the frame and configured to drive the at least one actuator, a sensor module (e.g., the sensor module 176 or 340) disposed inside the frame and configured to sense the motion of the camera assembly, and a processor (e.g., processor 120 or 320) operatively connected to the sensor module and the driver IC, such that the processor may be configured to acquire sensor information related to the motion of the camera assembly from the sensor module, determine, based on the sensor information, whether the camera assembly falls, and when it is determined that the camera assembly is falling, drive the at least one actuator through the driver IC to adjust the position of the at least one lens.

According to certain embodiments, the at least one actuator may include a first actuator (e.g., the auto focus actuator 312) configured to adjust the position of the at least one lens in order to perform auto-focusing of the camera assembly, and a second actuator (e.g., the OIS actuator) configured to adjust the position of the at least one lens in response to the motion of the camera assembly, and when it is determined that the camera assembly is falling, the processor may drive the first actuator to move the position of the at least one lens in the direction of the center axis of the lens barrel, and drive the second actuator to move the position of the at least one lens in a direction perpendicular to the center axis of the lens barrel, thereby moving the at least one lens toward the center of the lens barrel.

As described above, according to certain embodiments, an electronic device (e.g., the electronic device 101 or the electronic device 200) may include a housing (e.g., the housing 210), which includes a first surface (e.g., the first surface 210A) facing a first direction and a second surface (e.g., the second surface 210B) facing a second direction opposite to the first direction, a camera module (e.g., camera module 180, 205, 255, 310, or 400), which is disposed in the housing so as to be aligned with a first opening formed in the first surface and includes a lens part (e.g., the lens 450) facing the first direction, and a support structure (e.g., the lens barrel 440) including a through-hole formed to receive the lens part, the support structure including a third surface (e.g., the top surface 443a) facing the first direction and including a second opening, and a fourth surface (e.g., top surface 441a) facing the first direction and extending in a third direction perpendicular to the first direction and the second direction, and a decorative member (e.g., the decorative member 410), which is at least partially exposed through the first opening and is disposed between the first surface and the camera module, and which includes a window layer (e.g., the window 420) including a fifth surface (e.g., the bottom surface 420a) facing the second direction, and a sixth surface (e.g., the bottom surface 411a) formed to be opposite to at least a part of the fourth surface, such that a first distance (e.g., the distance (d1) 403) between the third surface and the fifth surface may be larger than a second distance (e.g., the distance (d2) 404) between the fourth surface and the sixth surface.

According to certain embodiments, a third distance (e.g., the distance (d3) 405) from the center axis (e.g., the center axis 401) of the support structure to the sixth surface may be smaller than a fourth distance (e.g., the distance (d4) 406) from the center axis of the support structure to an end of the fourth surface extending in the third direction.

According to certain embodiments, the electronic device may further include a protective member (e.g., protective member 510) disposed between the fourth surface and the sixth surface.

According to certain embodiments, in the protective member, a compression ratio in the first direction may be equal to or smaller than a predetermined value, and a value obtained by multiplying the thickness of the protective member in the first direction and the compression ratio may be smaller than the distance between the third surface and the fifth surface.

According to certain embodiments, the electronic device may further include at least one actuator (e.g., the auto focus actuator 312) configured to change the position of the lens part; a driver IC (e.g., the auto focus driver 313) configured to drive the at least one actuator, a sensor module (e.g., the sensor module 176 or 340) configured to sense the motion of the electronic device, and a processor (e.g., the processor 120 or 320) operatively connected to the sensor module and the driver IC, such that the processor is configured to acquire sensor information related to the motion of the electronic device from the sensor module, determine, based on the sensor information, whether the electronic device falls, and when it is determined that the electronic device is falling, drive the at least one actuator through the driver IC to adjust the position of the lens part.

According to certain embodiments, the at least one actuator may include a first actuator (e.g., the auto focus actuator 312) configured to adjust the position of the lens part in order to perform auto-focusing of the camera module, and a second actuator (e.g., the OIS actuator) configured to adjust the position of the lens part in response to the motion of the camera module, and when it is determined that the electronic device is falling, the processor may drive the first actuator to move the position of the lens part in the first direction or in the second direction, and drive the second actuator to move the position of the lens part in the third direction or in a fourth direction opposite to the third direction, thereby moving the lens part toward the center of the support structure.

Figure 7:
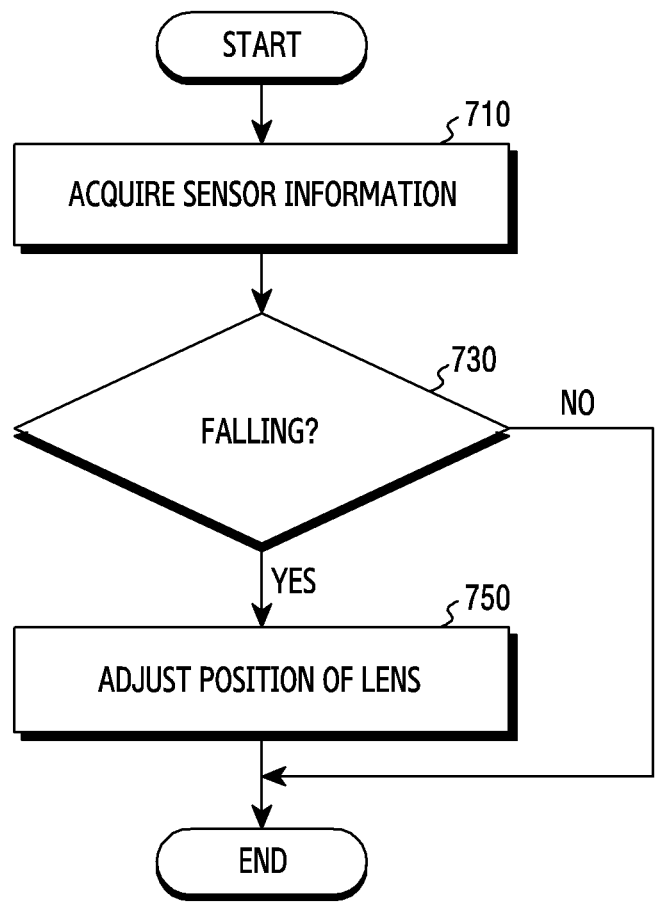
FIG. 7 is a view for describing a method for preventing damage of a camera lens by moving the position of the camera lens according to an embodiment.

FIG. 7 is a view for describing a method for preventing damage of a camera lens by moving the position of the camera lens according to an embodiment.

Referring to FIG. 7, in operation 710, a processor (e.g., the processor 120 in FIG. 1) of a camera assembly or an electronic device (e.g., the electronic device 101 in FIG. 1 or the electronic device 200 in FIGS. 2A and 2B) including the camera assembly may acquire sensor information from a sensor module (e.g., the sensor module 176 in FIG. 1 or the sensor module 204 in FIGS. 2A and 2B). The sensor module may include at least one of a gyro sensor or an acceleration sensor. The sensor information may include, for example, a sensor value according to motion of the camera assembly or the electronic device. The sensor value may include, for example, acceleration values of the camera assembly or the electronic device in the X-axis, Y-axis, and Z-axis directions.

In operation 730, the processor may determine, based the sensor information, whether the camera assembly or the electronic device is falling. For example, when the time, during which the acceleration in the Z-axis direction maintains a value equal to or greater than a designated value, exceeds a designated time, the processor may determine that the camera assembly or the electronic device is falling. Herein, the designated time may be set in consideration of a height from which a fall would cause damage to the device (e.g., a free-fall time), or an overall driving time of an actuator (e.g., the OSI actuator or the AF actuator 312 in FIG. 3). The driving time of the actuator may include a summation of a time during which power is applied to an actuator driver IC, a time during which a driving command is transferred to the actuator driver IC, and a time during which the actuator driver IC transfers a control signal to the actuator. For example, when the time during which power is applied to the actuator driver IC is 20 µs, the time during which a driving command is transferred to the actuator driver IC is 10 ms, and the time during which the actuator driver IC transfers a control signal to the actuator is 100 ms, the total driving time of the actuator may be about 110 ms. Therefore, if the height from which a fall would cause damage is 152 cm, a free-fall time is about 0.55 s, and thus the designated time for determination of falling may be set to be shorter than the time obtained by subtracting the driving time of the actuator from the free-fall time. In one example, under the above-described condition, the designated time may be set to about 100 ms.

When it is determined that the camera assembly and the electronic device is falling, the processor may adjust the position of at least one lens (e.g., the lens 450 in FIG. 6) in operation 750. For example, the processor may adjust the position of the at least one lens by using the actuator. In one example, the processor may move, using an AF actuator (e.g., the AF actuator 312), the position of the at least one lens in the upward/downward direction to fix the position of the at least one lens to the center point in a Z-axis direction (e.g., code 250 when the full range is code 512). The Z-axis direction may be the direction of the center axis (e.g., the center axis 401) of a lens barrel (e.g., the lens barrel 440) in which the at least one lens is seated. In another example, the processor may move, using an OIS actuator, the position of the at least one lens in the leftward/rightward direction to fix the position of the at least one lens to the center point in an X-axis direction and/or a Y-axis direction (e.g., a crossing point at which the X-axis (or Y-axis) crosses the center axis of the lens barrel). In another example, the processor may move, using the AF actuator and the OIS actuator, the position of the at least one lens in the upward, downward, leftward, and rightward directions to fix the position of the at least one lens to the center point in the X-axis direction, the Y-axis direction, and the Z-axis (e.g., toward the center of the lens barrel). By stowing the lens in this manner, the camera may be better secured against damage caused by impacts and shocks resultant from falling.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
    a housing including a first surface facing a first direction, a second surface facing a second direction opposite to the first direction, and a side surface at least partially surrounding a space formed between the first surface and the second surface;
    a camera module seated within the housing, and aligned with an opening formed in the first surface;
    a housing member including:
        a first portion connected to the first surface at a position where the opening is formed and forming a hollow corresponding to the opening,
        a second portion extending from the first portion in a direction substantially identical to the first direction and surrounding the hollow, and
        a window seated on the second portion covering the hollow;
    a processor operatively connected to the camera module; and
    a memory operatively connected to the processor,
    wherein the camera module includes:
        at least one lens, and
        a lens barrel including a cylindrical lower portion having a diameter greater than the at least one lens, an extension portion extending from a top surface of the lower portion in a direction oblique to the first direction, and a cylindrical upper portion extending from a top surface of the extension portion in the first direction and having a diameter smaller than the lower portion, and
    wherein a distance from the top surface of the lower portion to a bottom surface of the first portion is smaller than a distance from a top surface of the upper portion to a bottom surface of the window.

2. The electronic device of claim 1, wherein a distance from a center axis of the lens barrel to a side surface of the lower portion is greater than a distance from the center axis of the lens barrel to the bottom surface of the first portion.

3. The electronic device of claim 1, further comprising:
    a protective member disposed between the top surface of the lower portion and the bottom surface of the first portion.

4. The electronic device of claim 1, further comprising:
    a frame seating the lens barrel and surrounding the lower portion; and
    a protective member disposed between a top surface of the frame and the bottom surface of the first portion.

5. The electronic device of claim 4, wherein the protective member includes a compression ratio oriented in the first direction less than or equal to a predetermined value, and a value obtained by multiplying a thickness of the protective member in the first direction and the compression ratio is smaller than the distance between the top surface of the upper portion and the bottom surface of the window.

6. The electronic device of claim 1, further comprising:
    at least one actuator configured to change a position of the at least one lens;
    a driver integrated circuit (IC) configured to drive the at least one actuator; and
    a sensor module configured to detect motion of the electronic device,
    wherein the processor is configured to:
        detect the motion of the electronic device from the sensor module as sensor information;
        determine, based on the sensor information, whether the electronic device is falling; and when determining that the electronic device is falling, drive the at least one actuator through the driver IC to change the position of the at least one lens.

7. The electronic device of claim 6, wherein the at least one actuator comprises:
   a first actuator configured to adjust the position of the at least one lens to execute auto-focusing of the camera module, and
   a second actuator configured to adjust the position of the at least one lens in response to detecting motion of the camera module, and
   wherein the processor is configured to:
      when determining that the electronic device is falling, drive the first actuator to move the position of the at least one lens along the center axis of the lens barrel, and drive the second actuator to move the position of the at least one lens in a direction perpendicular to the center axis of the lens barrel, wherein an overall movement caused by the first and second actuators transitions the at least one lens toward a center of the lens barrel.

8. A camera assembly comprising:
   a housing member including a first portion forming a hollow, a second portion extending from the first portion in a first direction and surrounding the hollow, and a window seated on the second portion covering the hollow;
   a frame spaced by a predetermined distance apart from a bottom surface of the first portion in a second direction opposite to the first direction;
   a lens barrel aligned with the hollow and seated within the frame; and
   at least one lens disposed within in the lens barrel, wherein the lens barrel comprises:
      a cylindrical lower portion having a diameter greater than the at least one lens;
      an extension portion extending from a top surface of the lower portion in a direction oblique to the first direction; and
      a cylindrical upper portion extending from a top surface of the extension portion in the first direction and having a diameter smaller than the lower portion, and
   wherein a distance from the top surface of the lower portion to the bottom surface of the first portion is smaller than a distance from a top surface of the upper portion to a bottom surface of the window.

9. The camera assembly of claim 8, wherein a distance from a center axis of the lens barrel to a side surface of the lower portion is greater than a distance from the center axis of the lens barrel to the bottom surface of the first portion.

10. The camera assembly of claim 8, further comprising:
   a protective member disposed between the top surface of the lower portion and the bottom surface of the first portion.

11. The camera assembly of claim 8, further comprising:
   a protective member disposed between a top surface of the frame and the bottom surface of the first portion.

12. The camera assembly of claim 11, wherein the protective member includes a compression ratio oriented in the first direction less than or equal to a predetermined value, and a value obtained by multiplying a thickness of the protective member in the first direction and the compression ratio is smaller than the distance between the top surface of the upper portion and the bottom surface of the window.

13. The camera assembly of claim 8, further comprises:
   at least one actuator disposed within the frame and configured to change a position of the at least one lens;
   a driver integrated circuit (IC) disposed within the frame and configured to drive the at least one actuator;
   a sensor module disposed within the frame and configured to detect motion of the camera assembly; and
   a processor operatively connected to the sensor module and the driver IC,
   wherein the processor is configured to:
      detect the motion of the camera assembly from the sensor module as sensor information;
      determine, based on the sensor information, whether the camera assembly is falling; and
      when it is determined that the camera assembly is falling, drive the at least one actuator through the driver IC to change the position of the at least one lens.

14. The camera assembly of claim 13, wherein the at least one actuator comprises:
   a first actuator configured to change the position of the at least one lens in order to execute auto-focusing of the camera assembly; and
   a second actuator configured to change the position of the at least one lens in response to the motion of the camera assembly, and
   the processor is configured to, when it is determined that the camera assembly is falling, drive the first actuator to move the position of the at least one lens along the center axis of the lens barrel, and drive the second actuator to move the position of the at least one lens in a direction perpendicular to the center axis of the lens barrel, wherein an overall movement caused by the first and second actuators transitions the at least one lens toward a center of the lens barrel.

15. An electronic device, comprising:
   a housing comprising a first surface facing a first direction and a second surface facing a second direction opposite to the first direction;
   a camera module disposed within the housing aligned with a first opening formed in the first surface, the camera module including:
      a lens part facing the first direction, and
      a support structure including a through-hole formed to receive the lens part, the support structure forming a third surface facing the first direction and having a second opening, and a fourth surface facing the first direction and extending in a third direction perpendicular to the first direction and the second direction; and
   a decorative member including:
      a first portion connected to the first surface at a position where the first opening is formed and forming a hollow corresponding to the first opening,
      a second portion extending from the first portion in a direction substantially identical to the first direction and surrounding the hollow, and
      a window seated on the second portion covering the hollow;
   the decorative member at least partially exposed through the first opening and disposed between the first surface and the camera module, the decorative member including the window forming a fifth surface facing the second direction, and a sixth surface oriented to be opposite to at least a part of the fourth surface, wherein a first distance between the third surface and the fifth surface is larger than a second distance between the fourth surface and the sixth surface.

16. The electronic device of claim 15, wherein a third distance from a center axis of the support structure to the sixth surface is smaller than a fourth distance from the center axis of the support structure to an end of the fourth surface extending in the third direction.

17. The electronic device of claim 15, further comprising:
a protective member disposed between the fourth surface and the sixth surface.

18. The electronic device of claim 17, wherein the protective member has a compression ratio oriented in the first direction less than or equal to a predetermined value, and a value obtained by multiplying a thickness of the protective member in the first direction and the compression ratio is smaller than a distance between the third surface and the fifth surface.

19. The electronic device of claim 15, further comprising:
at least one actuator configured to change a position of the lens part;
a driver integrated circuit (IC) configured to drive the at least one actuator;
a sensor module configured to detect motion of the electronic device; and
a processor operatively connected to the sensor module and the driver IC,
wherein the processor is configured to:
detect the motion of the electronic device from the sensor module as sensor information;
determine, based on the sensor information, whether the electronic device is falling; and
when it is determined that the electronic device is falling, drive the at least one actuator through the driver IC to adjust the position of the lens part.

20. The electronic device of claim 19, wherein the at least one actuator comprises:
a first actuator configured to adjust the position of the lens part in order to execute auto-focusing of the camera module, and
a second actuator configured to adjust the position of the lens part in response to detecting motion of the camera module, and
wherein the processor is configured to:
when determining that the electronic device is falling, drive the first actuator to move the position of the lens part in the first direction or in the second direction, and drive the second actuator to move the position of the lens part in the third direction or in a fourth direction opposite to the third direction, wherein an overall movement caused by the first and second actuators transitions the lens part toward a center of the support structure.

* * * * *